(12) United States Patent
Carrigan et al.

(10) Patent No.: US 10,877,237 B2
(45) Date of Patent: Dec. 29, 2020

(54) MULTI-MATERIAL MIRROR SYSTEM

(71) Applicant: Raytheon Company, Waltham, MA (US)

(72) Inventors: Keith Carrigan, Playa Vista, CA (US); John F. Silny, Playa Vista, CA (US)

(73) Assignee: Raytheon Company, Waltham, MA (US)

( * ) Notice: Subject to any disclaimer, the term of this patent is extended or adjusted under 35 U.S.C. 154(b) by 301 days.

(21) Appl. No.: 15/828,223

(22) Filed: Nov. 30, 2017

(65) Prior Publication Data

US 2019/0162931 A1 May 30, 2019

(51) Int. Cl.
*G02B 7/18* (2006.01)
*G02B 17/06* (2006.01)
(Continued)

(52) U.S. Cl.
CPC .............. *G02B 7/181* (2013.01); *G02B 7/008* (2013.01); *G02B 7/183* (2013.01); *G02B 17/061* (2013.01); *G02B 23/16* (2013.01)

(58) Field of Classification Search
CPC ........ G02B 7/181; G02B 23/16; G02B 7/008; G02B 7/183; G02B 17/061
(Continued)

(56) References Cited

U.S. PATENT DOCUMENTS 3,914,063 A * 10/1975 Papayoti ............... E04B 1/1903
403/217
4,285,728 A 8/1981 Babcock et al.
(Continued)

FOREIGN PATENT DOCUMENTS

CN 101470223 B 10/2012
CN 104451580 A 3/2015
(Continued)

OTHER PUBLICATIONS

Black, Harris Corp., Rochester, NU, US, https://www.compositesword.com/articles/harris-corp-rochester-ny-us, Feb. 26, 2016, 7 pages, CompositesWorld, Cincinnati, OH.
(Continued)

*Primary Examiner* — Jade R Chwasz

(57) ABSTRACT

A mirror system is disclosed. The mirror system can include a primary mirror, and a secondary mirror supported relative to the primary mirror. The primary mirror and the secondary mirror can have different coefficients of thermal expansion (CTE). A negative CTE strut is also disclosed. The negative CTE strut can include a main body portion. The negative CTE strut can also include a first coupling portion and a second coupling portion disposed opposite one another about the main body portion and defining a strut length. The first and second coupling portions can each be configured to interface with an external structure. In addition, the negative CTE strut can include an offsetting extension member having a first end coupled to the main body portion and a second end coupled to the first coupling portion by an intermediate extension member. The first end can be between the first coupling portion and the second end. The first and second ends can define an offset length parallel to the strut length. When the negative CTE strut increases in temperature, the offset length can be configured to increase due to thermal expansion of the offsetting extension member sufficient to cause the strut length to decrease.

20 Claims, 4 Drawing Sheets

(51) Int. Cl.
G02B 23/16 (2006.01)
G02B 7/00 (2006.01)
G02B 7/183 (2006.01)

(58) Field of Classification Search
USPC .......................................................... 359/858
See application file for complete search history.

(56) References Cited

U.S. PATENT DOCUMENTS

| | | | |
|---|---|---|---|
| 4,856,887 | A | 8/1989 | Wakugawa et al. |
| 5,302,561 | A | 4/1994 | Ezis |
| 5,358,685 | A | 10/1994 | Ezis |
| 5,643,514 | A | 7/1997 | Chwastiak et al. |
| 7,244,034 | B1 | 7/2007 | Karandikar et al. |
| 8,292,537 | B2 | 10/2012 | Newswander |
| 8,607,513 | B2 | 12/2013 | Anderson |
| 2003/0026534 | A1 | 2/2003 | Skull et al. |
| 2005/0141108 | A1* | 6/2005 | Atkinson ............... G02B 7/183 359/820 |
| 2007/0207268 | A1 | 9/2007 | Webb et al. |
| 2011/0221084 | A1 | 9/2011 | Goodman et al. |
| 2015/0077874 | A1 | 3/2015 | Naepflin et al. |
| 2017/0090178 | A1 | 3/2017 | Bullard et al. |

FOREIGN PATENT DOCUMENTS

| | | | |
|---|---|---|---|
| EP | 0794442 | A1 | 9/1997 |
| JP | 2010262163 | A * | 11/2010 |
| JP | 2010262163 | A | 11/2010 |

OTHER PUBLICATIONS

European Space Agency, Herschel Primary Mirror Fabrication, http://sci.esa.int/herschel/34705-herschel-primary-mirror-fabrication/, Mar. 18, 2004, 2 pages, European Space Agency, France.

Matthews, HDST Mirror Technology Assessment, https://asd.gsfc.nasa.gov/conferences/uvvis/flagship/UVVis_Flagship_Matthews.pdf, to the best of the applicant's knowledge article was available before the application filed, 15 pages.

Johnson, Sic coatings on RB SiC mirrors for ultrasmooth surfaces, SPIE.Digital Library, Dec. 6, 1993, 2 pages, SPIE, Bellingham, WA.

Robichaud et al., Silicon Carbide Optics for Space Situational Awareness and Responsive Space Needs, Proceedings of the Advanced Maui Optical and Space Surveillance Technologies Conference, 2008, 5 pages, L-3 Communications; SSG—Tinsley, Inc., Wilmington, MA.

Wang et al., Surface modification on silicon carbide mirror for space application, Key Laboratory of Optical System Advanced Manufacturing Technology, Apr. 30, 2010, vol. 8, Supplement, Chinese Optics Letters, China.

Lei et al., Athermalization of Coaxial Reflective Space Telescope, Proceedings of SPIE, Oct. 13, 2010, vol. 4654, 5 pages, SPIE, Bellingham, Washington.

International Search Report for International Application No. PCT/US2018/053600 dated Apr. 11, 2019, 22 pages.

Machado et al., Picometer resolution interferometric characterization of the dimensional stability of zero CTE CFRP, Proceedings of SPIE, Jul. 23, 2008, vol. 7018, 12 pages, SPIE, Bellingham, Washington.

Romeo et al., Final assembly of the ULTRA 1-m carbon fiber optical telescope, Proceedings of SPIE, Sep. 17, 2007, vol. 6665, 10 pages, SPIE, Bellingham, Washington.

West et al., Wavefront control of the Large Optics Test and Integration Site (LOTIS) 6.5 m Collimator, Applied Optics, Jun. 20, 2010, vol. 49, No. 18, 16 pages, The Optical Society, Washington, DC.

Invitation to Pay Additional Fees for International Application No. PCT/US2018/053600 dated Jan. 23, 2019, 17 pages.

International Search Report for International Application No. PCT/US2019/023936 dated Jun. 3, 2019, 13 pages.

* cited by examiner

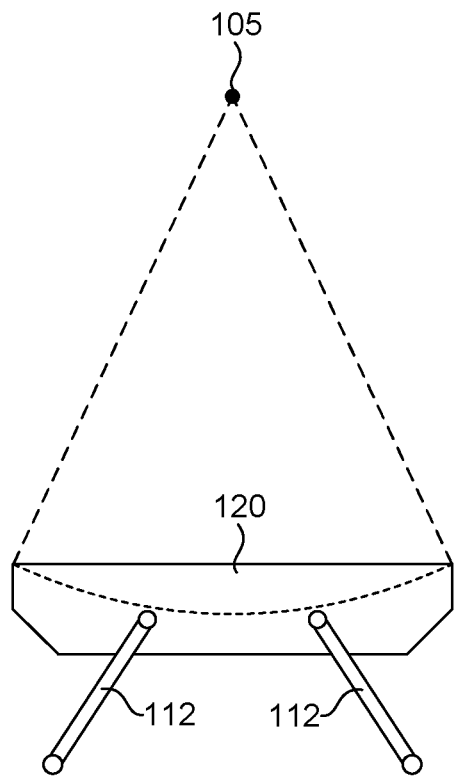
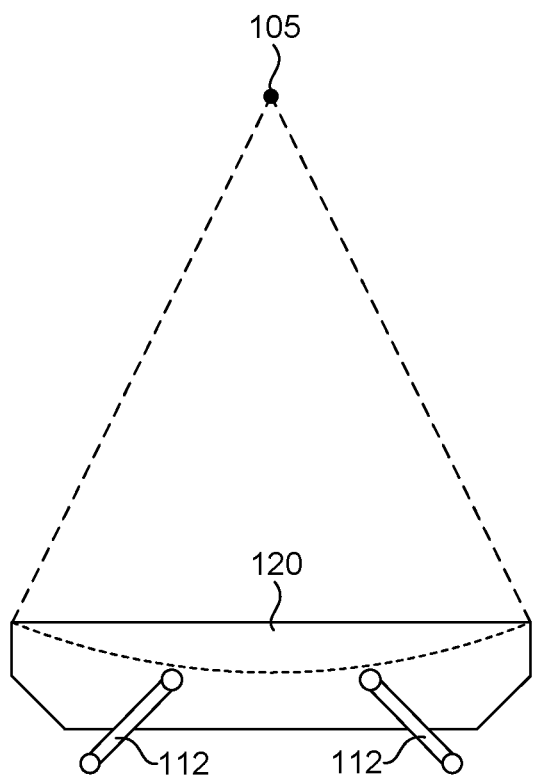
FIG. 3A  FIG. 3B

MULTI-MATERIAL MIRROR SYSTEM

BACKGROUND

Cassegrain reflector-type imaging systems in space-based telescopes commonly found on satellites are susceptible to environmental (e.g., temperature) variations that can reduce image quality. Mirror systems used in such imaging systems are therefore designed to reduce sensitivity to environmental variation. One typical mirror system design utilizes near-zero coefficient of thermal expansion (CTE) material for all optics (e.g., ultra-low expansion (ULE) glass mirrors) and support structures in an optical system. This design is effectively insensitive to environmental variation. Another typical mirror system design utilizes relatively high CTE silicon carbide (SIC) for all optics and all support structures in an optical system. Although the SiC material is susceptible to thermal expansion, the uniform CTE for all components in the system is somewhat effective in reducing sensitivity to environmental variation when incorporating thermal compensation and/or active temperature control.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 3A and 3B illustrate operation of the negative CTE strut of FIG. 2 with a positive CTE primary mirror, in accordance with an example of the present disclosure.

Figure 1:
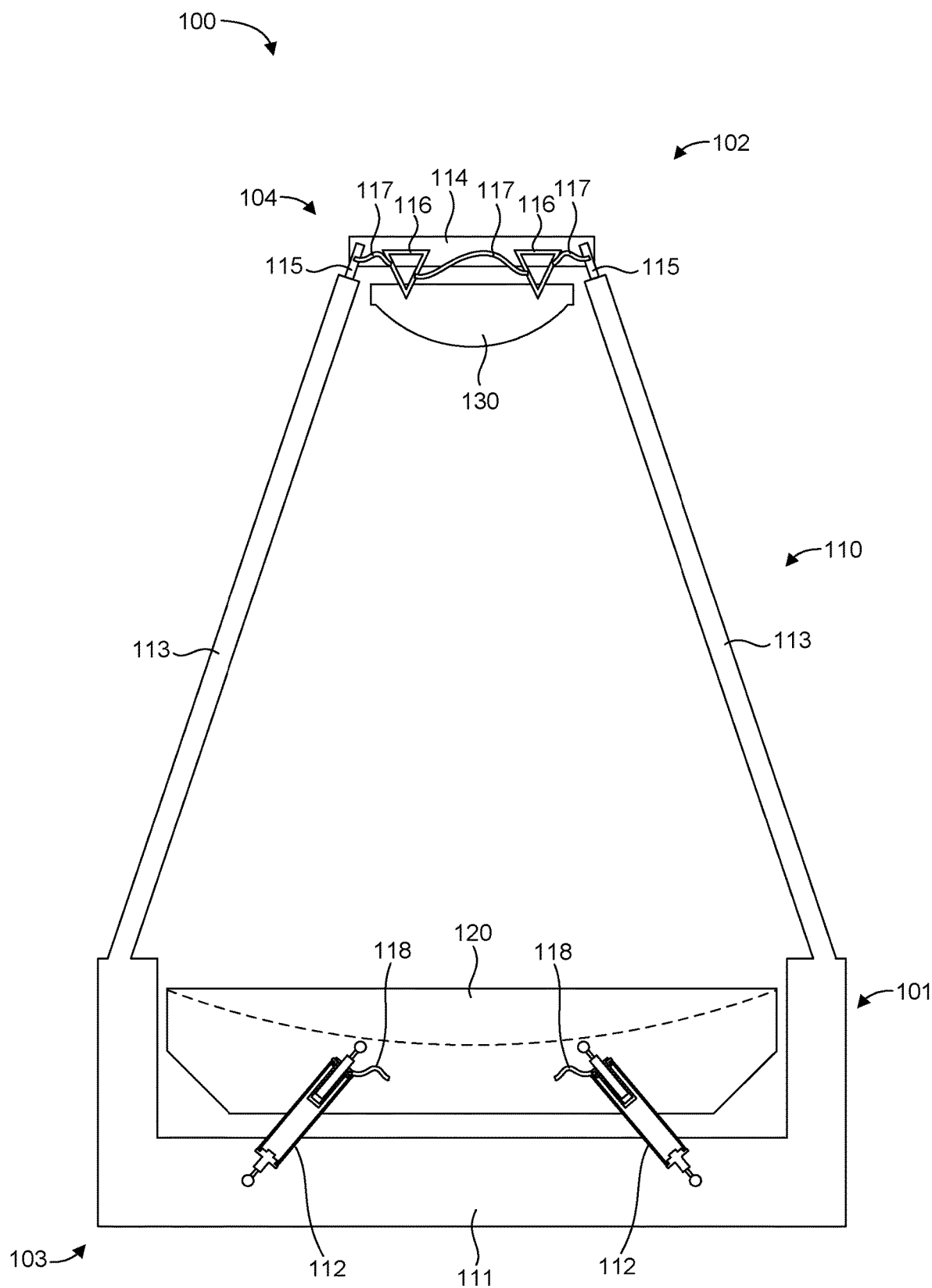
FIG. 1 is an illustration of a mirror system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although mirror system designs incorporating all near-zero CTE components are effective in eliminating sensitivity to environmental variations, ULE glass mirrors are relatively heavy and difficult to produce. The low stiffness to weight ratio of ULE glass material results in self-weight deflection in large ULE glass mirrors (e.g., primary mirrors in Cassegrain reflector mirror systems), which complicates alignment and testing on the ground. In addition, mirror system designs incorporating all SiC components, which is less expensive than ULE glass, but has a relatively high CTE, requires excellent thermal control to minimize the effects of environmental variations or a continuous refocus mechanism to adjust for the effects of such environmental variations.

Accordingly, a mirror system is disclosed that provides image quality that meets high resolution requirements at lower cost than near-zero CTE mirror systems and with shorter manufacturing schedules, and provides superior image quality than all SiC mirror systems at nearly the same cost and manufacturing schedule. In one aspect, the mirror system can be configured with different CTE at front and back ends to specifically address the environmental variations experienced at those locations. The mirror system can include a primary mirror, and a secondary mirror supported relative to the primary mirror. The primary mirror and the secondary mirror can have different CTE.

A negative CTE strut is also disclosed. The negative CTE strut can include a main body portion. The negative CTE strut can also include a first coupling portion and a second coupling portion disposed opposite one another about the main body portion and defining a strut length. The first and second coupling portions can each be configured to interface with an external structure. In addition, the negative CTE strut can include an offsetting extension member having a first end coupled to the main body portion and a second end coupled to the first coupling portion by an intermediate extension member. The first end can be between the first coupling portion and the second end. The first and second ends can define an offset length parallel to the strut length. When the negative CTE strut increases in temperature, the offset length can be configured to increase due to thermal expansion of the offsetting extension member sufficient to cause the strut length to decrease.

To further describe the present technology, examples are now provided with reference to the figures. With reference to FIG. 1, one example of a mirror system 100 is schematically illustrated in a side view. The mirror system 100 can include a support structure 110. The mirror system 100 can also include a primary mirror 120 supported by the support structure 110. In addition, the mirror system 100 can include a secondary mirror 130 supported by the support structure 110. In some examples, the primary mirror 120 and the secondary mirror 130 form a Cassegrain reflector, which may be used in optical telescopes (e.g., high resolution imaging systems) and radio antennas.

The support structure 110 can comprise a metering structure, which can include a base 111 (e.g., a bench that forms the structural base of the mirror system 100) coupled to the primary mirror 120 by one or more primary mirror struts 112. The support structure 110 can also include one or more secondary mirror struts 113 extending from the base 111 and coupled to the secondary mirror 130. For example, the secondary mirror struts 113 can support a secondary mirror mount 114, which can be coupled to the secondary mirror 130. A primary mirror assembly 101 can include the base 111, the primary mirror struts 112, and the primary mirror 120. A secondary mirror assembly 102 can include the secondary mirror struts 113, the secondary mirror mount 114, and the secondary mirror 130.

In a typical space-based application (e.g., one in which the mirror system is mounted on a satellite), the mirror system 100 can be subjected to environmental variations over the course of their orbit of the earth, which result in thermal transient conditions that can vary for different parts of the mirror system 100. For example, the mirror system 100 will typically be mounted to a satellite by the base 111 at a "back end" 103 of the mirror system 100, with a "front end" 104 of the mirror system 100 protruding from the satellite. In this configuration, the relatively large mass at the back end 103 of the mirror system 100 may be thermally insulated compared to the relatively small, exposed mass at the front end 104 of the mirror system 100. The components at the front end 104 (e.g., the secondary mirror assembly 102) can therefore experience greater thermal variation that can change the thermal loading on a daily basis (e.g., day/night, changing inclination of the satellite relative to the earth (i.e., beta angle of orbit), etc.). As a result, the components at the back end 103 (e.g., the primary mirror assembly 101) do not see as much thermal variation as the components at the front end 104 (e.g., the secondary mirror assembly 102).

In one aspect of the present disclosure, the various components of the mirror system 100 can be selected and configured to provide suitable CTE for the thermal conditions the components will be subjected to during use. For example, the primary mirror 120 at the back end 103 can have a non-zero CTE, and the secondary mirror 130 at the front end 104 can have a near-zero CTE. As used herein, the term "near-zero CTE" includes any CTE greater than or equal to $-4.1 \times 10^{-7}$ K$^{-1}$ and less than or equal to $4.1 \times 10^{-7}$ K$^{-1}$. The term "non-zero CTE" includes any CTE outside of this range. More specifically, the primary mirror 120 can comprise any suitable mirror material having a non-zero CTE, such as silicon carbide (SiC) (e.g., reaction bonded or sintered), aluminum, aluminum silicon metal matrix composite, aluminum silicon carbide metal matrix composite, aluminum beryllium metal matrix composite, beryllium, fused silica, borosilicate glass, magnesium, etc., in any combination. On the other hand, the secondary mirror 130 can comprise any suitable mirror material having a near-zero CTE, such as glass-ceramic (e.g., CLEARCERAM@, ZERØ™, ZERODUR®, lithium-aluminosilicate glass-ceramic), titania-silicate glass (e.g., ULE®), carbon composite, etc., in any combination. Thus, the mirror system 100 can utilize primary and secondary mirrors 120, 130 having dissimilar CTEs, which when utilized as described herein, specifically address the different environmental variations at the back and front ends 103, 104 of the mirror system 100. For example, the near-zero CTE secondary mirror 130 can reduce defocus sensitivity to bulk temperature changes at the secondary mirror 130, which is more susceptible to temperature variations due to its location relative to the primary mirror 120.

In one aspect, any or all of the components of the support structure 110 can have a near-zero CTE. For example, the base 111, the primary mirror struts 112, the secondary mirror struts 113, and/or the secondary mirror mount 114 can have a near-zero CTE. The components of the support structure 110 can comprise any suitable structural material having a near-zero CTE, such as a composite material (e.g., carbon composite such as carbon fiber, carbon nanotubes). For example, the base 111, the secondary mirror struts 113, and the secondary mirror mount 114 can be made of carbon fiber. The secondary mirror struts 113 and the secondary mirror mount 114 can be coupled to one another by INVAR® mounting hardware 115. Similarly, the secondary mirror mount 114 and the secondary mirror 130 can be coupled to one another by INVAR® mounting hardware 116. Although some non-zero CTE materials may be included, such as when coupling components to one another, the total or combined CTE (i.e., of a "chain" of metering structures) may be within the range specified for near-zero CTE.

High thermal conductivity "thermal straps" 117 can be included to thermally couple the secondary mirror struts 113, the secondary mirror mount 114, and/or the secondary mirror 130 to one another. Similarly, thermal straps 118 can be included to thermally couple the primary mirror struts 112, the primary mirror 120, and/or the base 111 to one another. The thermal straps 117, 118 can thermally "tie" components to one another, such that a temperature change in one component will rapidly be experienced by another component to maintain the components at substantially the same temperature, which can minimize temperature gradients that can negatively impact image quality.

Because of where the front end 104 of the mirror system 100 is situated on a satellite, it cannot be actively temperature controlled. Accordingly, it is advantageous for the secondary assembly 102 to have a near-zero CTE so that it is minimally affected by temperature variations. On the other hand, the back end 103 of the mirror system 100 has a relatively large mass and is somewhat insulated by the satellite and, in some examples, may be actively temperature controlled. Thus, a relatively large potential for thermal expansion may be tolerable for components at the back end 103 of the mirror system 100. Accordingly, the primary mirror assembly 101 may have a non-zero CTE. In some examples, this allows the use of a non-zero CTE material as the predominant material of the primary mirror 120, which may be manufactured for lower cost and on shorter schedules than a primary mirror made predominantly of a near-zero CTE material.

The primary mirror struts 112 can have any suitable construction and can be made of any suitable material in keeping with the invention as described herein. In some examples, the primary mirror struts 112 can comprise a negative CTE, which can be configured to provide thermal compensation for a non-zero CTE primary mirror 120. This configuration can be leveraged to match the constant conjugate position of a near-zero CTE of the secondary mirror and the various support components, as shown in FIGS. 3A and 3B and discussed in more detail below. In other words, by selecting an appropriate negative CTE for the primary mirror struts 112, the behavior of the back end 103 (i.e., primary mirror end) and the front end 104 (i.e., secondary mirror end) of the mirror system 100 can be matched for a given environment, such that the focal point location of each end remains constant over temperature.

Figure 2:
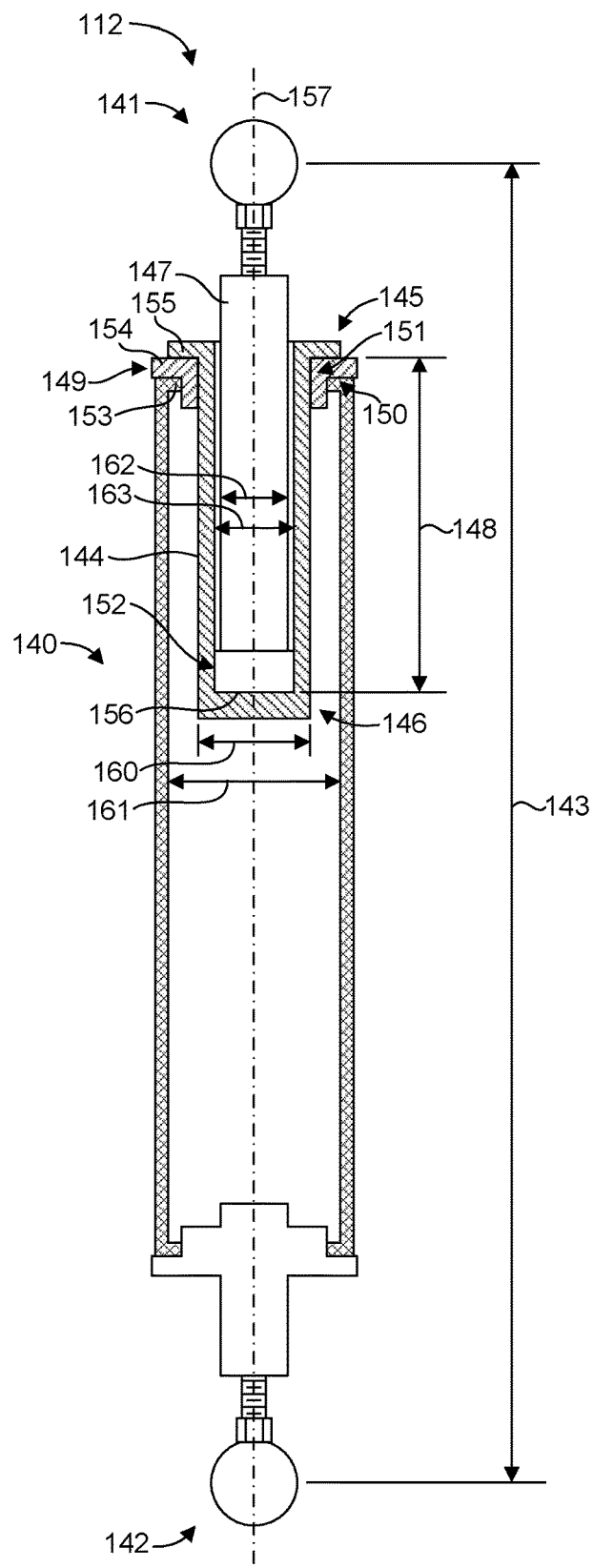
FIG. 2 is an illustration of a negative CTE strut in accordance with an example of the present disclosure.

As shown in FIG. 2, a negative CTE strut 112 can include a main body portion 140 and first and second coupling portions 141, 142 disposed opposite one another about the main body portion 140. The coupling portions 141, 142 can each be configured to interface with an external structure (e.g., fittings or hardware configured to facilitate coupling to the primary mirror 120 and the base 111 in FIG. 1) and define a strut length 143. In one aspect, the coupling portions 141, 142 can include a spherical ball for interfacing with an external structure to facilitate relative rotation of the strut 112 and the external structure. In some aspects, the coupling portions 141, 142 can be configured to facilitate length adjustment of the strut 112 (e.g., via threaded rods) to facilitate proper alignment of the primary mirror 120 at assembly.

The negative CTE strut 112 can also include an offsetting extension member or spacer 144 having a first end 145 coupled to the main body portion 140, and a second end 146 coupled to the first coupling portion 141 by an intermediate extension member 147. The first end 145 can be between the first coupling portion 141 and the second end 146. The first and second ends 145, 146 can define an offset length 148 parallel to the strut length 143. When the negative CTE strut 112 increases in temperature, the offset length 148 can be configured to increase due to thermal expansion of the offsetting extension member 144 sufficient to cause the strut length 143 to decrease.

The main body portion 140, the coupling portions 141, 142, and the intermediate extension member 147 can have any suitable CTE. In some examples, the main body portion 140, the coupling portion 141, the coupling portion 142, and/or the intermediate extension member 147 can have a near-zero CTE. The main body portion 140, the coupling portion 141, the coupling portion 142, and/or the intermediate extension member 147 can therefore comprise any suitable structural material having a near-zero CTE, such as a composite material (e.g., carbon fiber, carbon nanotubes, etc.). A non-zero CTE material, such as a nickel-iron alloy (e.g., 64FeNi, such as INVAR®), can be used selectively such that the total or combined CTE (i.e., of a "chain" of structures) may be within the range specified for near-zero CTE, and thereby provide a near-zero CTE for a given structure or combination of structures. In some examples, the main body portion 140, the coupling portion 141, the coupling portion 142, and/or the intermediate extension member 147 can include materials with a non-zero CTE, such as nitrogen strengthened stainless steel (e.g., NITRONIC®). In some examples, the main body portion 140, the coupling portion 141, the coupling portion 142, and/or the intermediate extension member 147 can have a non-zero positive CTE. The offsetting extension member 144 can have any suitable non-zero positive CTE (i.e., a CTE greater than a near-zero CTE). The offsetting extension member 144 can therefore comprise any suitable structural material having a non-zero positive CTE, such as aluminum, titanium, iron, steel, nickel, beryllium, etc.

In some embodiments, the negative CTE strut 112 can include an insert 149 coupling the main body portion 140 and the first end 145 of the offsetting extension member 144. The insert 149 can aid in coupling a non-zero positive CTE offsetting extension member 144 to a near-zero CTE main body portion 140 by providing a structural buffer between two dissimilar CTE materials. In some examples, the insert 149 can comprise a material, such as nickel-iron alloy (e.g., 64FeNi, such as INVAR®), that is stronger than the material (e.g., aluminum) of the offsetting extension member 144 and has a similar CTE to the main body portion 140 (e.g., a composite material) to prevent breakage of the main body portion 140.

The main body portion 140, the insert 149, the offsetting extension member 144, and the intermediate extension member 147 can be coupled in any suitable manner, such as utilizing an adhesive, threaded interface surfaces (e.g., mating threaded surfaces or portions between the joined components), rivets, welds, etc. In one example, the insert 149 can be bonded at 150 to the main body portion 140, the first end 145 of the offsetting extension member 144 can be coupled to the insert 149 at 151 with threaded interface surfaces, and the intermediate extension member 147 can be coupled to the second end 146 of the offsetting extension member 144 at 152 with threaded interface surfaces. Flanges 153-155 of the respective main body portion 140, insert 149, and offsetting extension member 144 can facilitate coupling of the components and can provide proper relative positioning of the components at the first end 145 of the offsetting extension member 144. At the second end 146 of the offsetting extension member 144, the intermediate extension member 147 can be placed in full contact with a bottom surface 156 of the offsetting extension member 144. The flange 155 and the bottom surface 156 of the offsetting extension member 144 can establish the offset length 148.

The main body portion 140, the offsetting extension member 144, and/or the intermediate extension member 147 can each comprise a cylindrical configuration. In some examples, the main body portion 140, the offsetting extension member 144, and/or the intermediate extension member 147 can be coaxially aligned along a longitudinal axis 157. The main body portion 140, the offsetting extension member 144, and/or the intermediate extension member 147 can therefore be in-line with one another. The offsetting extension member 144 can be configured to fit at least partially within the main body portion 140, and the intermediate extension member 147 can be configured to fit within the offsetting extension member 144. Thus, an outer diameter 160 of the offsetting extension member 144 can be less than an inner diameter 161 of the main body portion 140, and an outer diameter 162 of the intermediate extension member 147 can be less than an inner diameter 163 of the offsetting extension member 144. This can enable free movement of these components relative to one another due to thermal expansion/contraction without generating undue internal stress while the offset length 148 and the strut length 143 vary due to temperature. A thermal strap (118 in FIG. 1) can be utilized to closely link the temperatures of the primary mirror 120 and the offsetting extension member 144 to maintain the primary mirror 120 and the offsetting extension member 144 at the same temperature for proper operation and thermal compensation, as described herein.

The CTE and axial expansion lengths of each of the various components of the strut 112 can be configured to provide a desired composite CTE of the strut 112 that is tuned for a given operating temperature range to provide passive thermal compensation for the non-zero CTE primary mirror 120. In examples where the main body portion 140, the coupling portion 141, the coupling portion 142, and the intermediate extension member 147 are constructed primarily of near-zero CTE materials, the offset length 148 of the offsetting extension member 144 is the primary variable in establishing the CTE of the strut 112.

In operation, as the temperature of the offsetting extension member 144 increases, the offsetting extension member 144 expands and increases the offset length 148. Due to the connection of the intermediate extension member 147 to the second end 146 of the offsetting extension member 144, the coupling portion 141 is caused to move toward the opposite coupling portion 142, thus effectively shrinking or contracting the strut length 143. The opposite occurs with a decrease in temperature. The result is a net negative CTE for the strut 112, which decreases in strut length 143 as the temperature increases, and increases in strut length 143 as the temperature decreases.

In one aspect, as schematically illustrated in FIGS. 3A and 3B, the negative CTE strut 112 can be configured to have a negative CTE to provide a suitable contraction/expansion over a given temperature range that offsets the expansion/contraction of a given positive CTE primary mirror 120. In general, for a positive CTE primary mirror 120 as shown in FIG. 3A, as the primary mirror 120 contracts with decreased temperature, a focus point 105 of the primary mirror 120 tends to shift toward the primary mirror, in front of the secondary mirror (not shown). On the other hand, as shown in FIG. 3B, as the primary mirror 120 expands with increased temperature, the focus point 105 tends to shift away from the primary mirror 120, behind the secondary mirror (not shown). Such tendencies of the focus point 105 to shift with temperature variation can make it difficult to maintain focus.

Utilizing the negative CTE struts 112 in conjunction with the positive CTE primary mirror 120, however, can passively maintain the focus point 105 of the primary mirror 120 in substantially the same location relative to the secondary mirror over a given temperature range. For example, as the primary mirror 120 contracts with decreased temperature and shifts the focus point 105 toward the primary mirror 120, the negative CTE struts 112 correspondingly expand or lengthen and push the primary mirror 120 toward the secondary mirror to passively maintain the focus point 105 in substantially the same location relative to the secondary mirror. As the primary mirror 120 expands with increased temperature and shifts the focus point 105 away from the primary mirror 120, the negative CTE struts 112 correspondingly contract or shorten and pull the primary mirror 120 away from the secondary mirror to passively maintain the focus point 105 in substantially the same location relative to the secondary mirror. Thus, the negative CTE struts 112 can be tuned or configured to accommodate varying temperature gradients and reduce primary mirror defocus sensitivity. In other words, the passive thermal compensation provided by the negative CTE struts 112 can provide a mirror system that is effectively insensitive to thermal variation. The result is a mirror system that can maintain the primary mirror focal point over a wide range of temperatures. In addition, the negative CTE struts 112 can enable use of a relatively inexpensive, high CTE primary mirror at a low cost while eliminating or minimizing the need for active thermal controls.

In some examples, a negative CTE strut may not be utilized depending on the operating environment of the mirror system or if the primary mirror (i.e., the back end of the mirror system) can be maintained at a given temperature, such as by an active temperature control.

Figure 4:
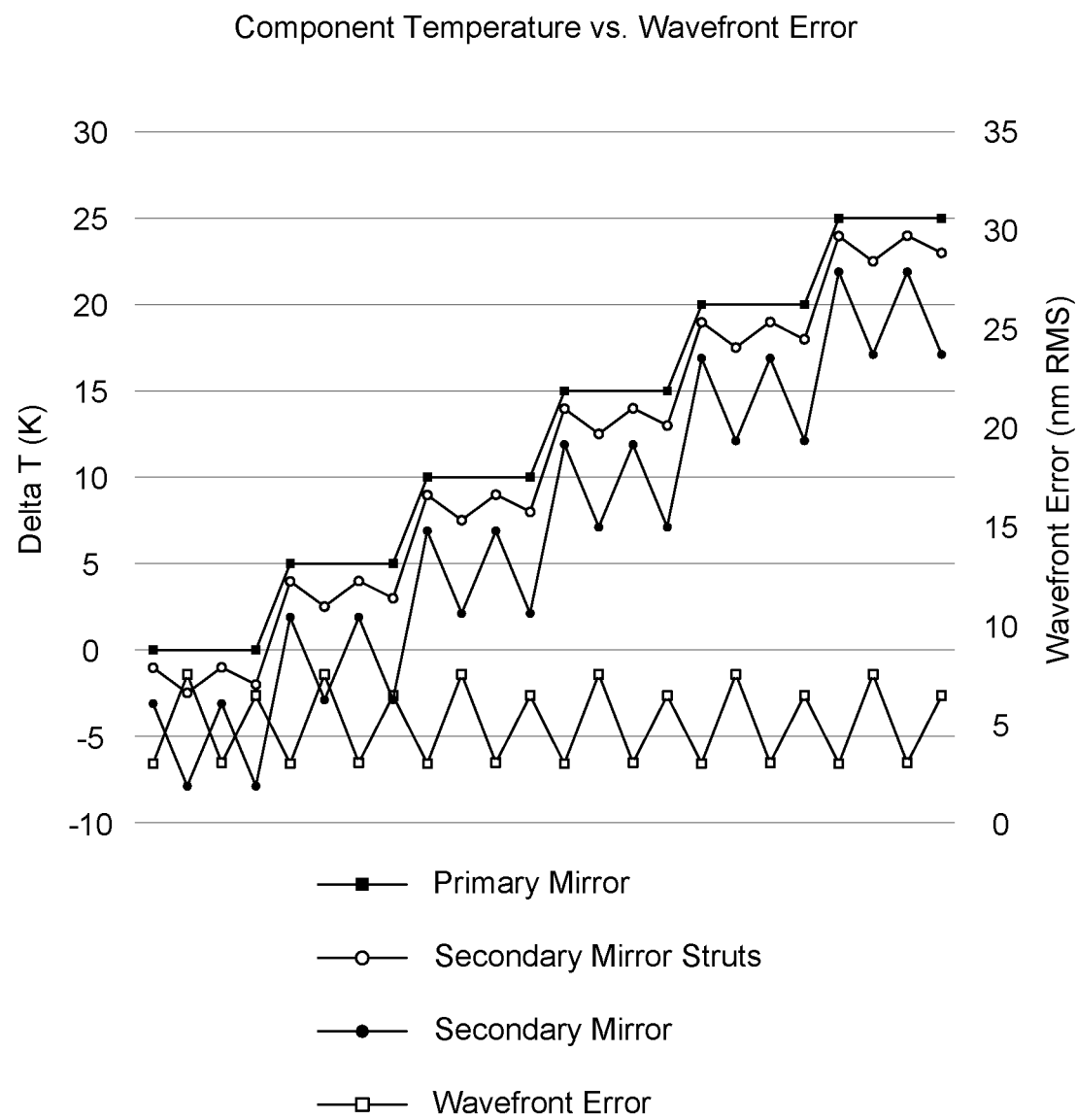
FIG. 4 is a graph of component temperature and image quality achievable by a mirror system in accordance with an example of the present disclosure.

The principles disclosed herein can maintain image quality at an acceptable level while the mirror system 100 experiences temperature variations. For example, FIG. 4 graphically represents component temperature and image quality (quantified as wavefront error). The temperature of the exposed front end components (e.g., the secondary mirror and struts) can vary greatly in response to changing environmental conditions, while the temperature of the relatively massive, insulated back end components (e.g., the primary mirror) remain relatively constant. The back end components will typically see temperature variation over a longer period of time. As shown in the graph, the wavefront error (i.e., image quality) remains at an acceptable level while the front end and back end components experience different types of temperature variation characteristics. The mirror system 100 can therefore benefit from material choices specific to the operating environment, so that the mirror system is thermally insensitive where it needs to be (i.e., at the exposed front end utilizing a near-zero CTE mirror and structural components) and allows for some thermal sensitivity where it is tolerable (i.e., at the relatively massive, insulated back end utilizing a non-zero CTE mirror and, optionally, negative CTE struts). This strategic use of materials (i.e., CTE characteristics) in the mirror system 100 can save manufacturing time and money, particularly with regard to the primary mirror, which is often the most difficult and expensive component to manufacture. As a result, the image quality of the mirror system 100 may be comparable to that of a telescope made entirely of near-zero CTE materials, while being much less expensive to make in a much shorter time frame. In addition, the cost and manufacturing time of the mirror system 100 may be close to that of a telescope made entirely of the same high CTE material (e.g., SiC), while producing a superior image quality. Thus, the mirror system 100 disclosed herein can produce high spatial resolution imaging with low wavefront error at reduced cost compared to other imaging systems.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A mirror system, comprising:
a base having a near-zero CTE;
a primary mirror strut having a negative CTE;
a primary mirror coupled to, and supported by, the base via the primary mirror strut, the primary mirror having a non-zero CTE; and a secondary mirror supported relative to the primary mirror, wherein the primary mirror and the secondary mirror have different coefficients of thermal expansion (CTE).

2. The mirror system of claim 1, wherein the secondary mirror has a near-zero CTE.

3. The mirror system of claim 1, further comprising a thermal strap thermally coupling the primary mirror and the primary mirror strut.

4. The mirror system of claim 1, further comprising a secondary mirror strut extending from the base and coupled to the secondary mirror.

5. The mirror system of claim 4, wherein the secondary mirror strut has a near-zero CTE.

6. The mirror system of claim 1, wherein the base comprises at least one of a composite material or a nickel-iron alloy.

7. The mirror system of claim 6, wherein the composite material comprises carbon fiber.

8. The mirror system of claim 6, wherein the nickel-iron alloy comprises 64FeNi.

9. The mirror system of claim 1, wherein the primary mirror comprises at least one of SiC or aluminum.

10. The mirror system of claim 1, wherein the secondary mirror comprises at least one of a lithium-aluminosilicate glass-ceramic material or a titania-silicate glass material.

11. The mirror system of claim 1, wherein the primary mirror and the secondary mirror form a Cassegrain reflector.

12. A mirror system, comprising:
a support structure having a base with a near-zero CTE, and primary and secondary mirror struts extending from the base, the primary mirror strut comprising a negative CTE;
a primary mirror coupled to the base by the primary mirror strut, the primary mirror being supported by the base and having a non-zero coefficient of thermal expansion (CTE); and
a secondary mirror coupled to the base by the secondary mirror strut and having a near-zero CTE.

13. The mirror system of claim 12, further comprising a thermal strap thermally coupling the primary mirror and the primary mirror strut.

14. The mirror system of claim 12, wherein the support structure comprises at least one of a composite material or a nickel-iron alloy.

15. The mirror system of claim 14, wherein the composite material comprises carbon fiber.

16. The mirror system of claim 14, wherein the nickel-iron alloy comprises 64FeNi.

17. The mirror system of claim 12, wherein the secondary mirror strut has a near-zero CTE.

18. The mirror system of claim 12, wherein the primary mirror comprises at least one of SiC or aluminum.

19. The mirror system of claim 12, wherein the secondary mirror comprises at least one of a lithium-aluminosilicate glass-ceramic material or a titania-silicate glass material.

20. The mirror system of claim 12, wherein the primary mirror and the secondary mirror form a Cassegrain reflector.

* * * * *